(12) United States Patent
Ozaki et al.

(10) Patent No.: US 12,676,167 B1
(45) Date of Patent: Jul. 7, 2026

(54) DATA STORAGE DEVICE WITH SPIRAL WRITE MODE HOP MITIGATION

(71) Applicant: WESTERN DIGITAL TECHNOLOGIES, INC., San Jose, CA (US)

(72) Inventors: Tomoo Ozaki, Fujisawa (JP); Kei Yasuna, Fujisawa (JP); Guoxiao Guo, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 19/009,389

(22) Filed: Jan. 3, 2025

(51) Int. Cl.
| | |
|---|---|
| *G11B 5/596* | (2006.01) |
| *G11B 5/03* | (2006.01) |
| *G11B 21/10* | (2006.01) |

(52) U.S. Cl.
CPC ............ *G11B 5/59661* (2013.01); *G11B 5/03* (2013.01); *G11B 21/106* (2013.01)

(58) Field of Classification Search
None
See application file for complete search history.

(56) References Cited

U.S. PATENT DOCUMENTS

| | | | |
|---|---|---|---|
| 5,668,679 | A | 9/1997 | Swearingen et al. |
| 6,943,978 | B1 | 9/2005 | Lee |
| 7,330,327 | B1 | 2/2008 | Chue et al. |
| 7,773,335 | B1 | 8/2010 | Adler et al. |
| 8,031,428 | B1 | 10/2011 | Rutherford |
| 8,462,458 | B1 | 6/2013 | Ton-That et al. |
| 9,064,517 | B1 * | 6/2015 | Neos ....................... G11B 5/596 |
| 9,093,097 | B1 | 7/2015 | Lee et al. |
| 9,153,266 | B1 * | 10/2015 | Chia ....................... G11B 5/607 |
| 9,947,356 | B1 * | 4/2018 | Oswald .............. G11B 5/59661 |
| 10,147,453 | B1 * | 12/2018 | Chu ....................... G11B 5/012 |
| 10,347,285 | B1 * | 7/2019 | Granz ................ G11B 20/1217 |
| 11,200,912 | B1 * | 12/2021 | Guo .......................... G11B 5/09 |
| 11,532,326 | B1 | 12/2022 | Laks |
| 11,574,650 | B1 * | 2/2023 | Liang ................. G11B 5/59694 |

(Continued)

FOREIGN PATENT DOCUMENTS

JP 2009087514 4/2009

OTHER PUBLICATIONS

Xu Chen et al., "Spiral Servo Writing in Hard Disk Drives Using Iterative Learning Based Tracking Control", https://www.researchgate.net/publication/259192428_Spiral_Servo_Writing_in_Hard_Disk_Drives_Using_Iterative_Learning_Based_Tracking_Control, Department of Mechanical Engineering, University of California, Berkeley, Proceedings of the 18th World Congressthe International Federation of Automatic Control Milano (Italy), Aug. 28-Sep. 2, 2011, 7 pages.

(Continued)

*Primary Examiner* — Peter Vincent Agustin
(74) *Attorney, Agent, or Firm* — Calderon Safran & Wright P.C.

(57) ABSTRACT

Various illustrative aspects are directed to a data storage device, method, and one or more processing devices that are configured to: apply a first set of settings to the assistive energy emitter in association with writing a first spiral to the disk surface; and apply a second set of settings to the assistive energy emitter in association with writing a second spiral to the disk surface, wherein the second set of settings is different than the first set of settings.

20 Claims, 6 Drawing Sheets

(56) References Cited

U.S. PATENT DOCUMENTS

| | | | |
|---|---|---|---|
| 11,587,587 B1 | 2/2023 | Yasuna et al. | |
| 12,046,266 B1 | 7/2024 | Guo et al. | |
| 2013/0077453 A1 | 3/2013 | Alex | |
| 2013/0279039 A1* | 10/2013 | Shiroishi | G11B 5/607 |
| | | | 360/48 |
| 2016/0093324 A1* | 3/2016 | Domke | G11B 7/261 |
| | | | 369/275.3 |
| 2018/0301163 A1* | 10/2018 | Lamberts | G11B 5/455 |
| 2019/0378541 A1* | 12/2019 | Granz | G11B 20/1217 |
| 2022/0246173 A1* | 8/2022 | Guo | G11B 5/02 |

OTHER PUBLICATIONS

Anonymous, "Spiral Servo Writing", https://msc.berkeley.edu/research/spiral-servo.html, MSC laboratory, Mechanical Systems Control Laboratory of Mechanical Engineering Dept, Year 2016, 2 pages.

Guo et al., "Achieving Minimal Repeatable Runout," Published in 2018 Asia-Pacific Magnetic Recording Conference (APMRC), 2018, 4 pages (Abstract only).

International Search Report and Written Opinion in corresponding foreign application PCT/US2025/060363, mailed Apr. 22, 2026, 10 pages.

* cited by examiner

APPLY A FIRST SET OF SETTINGS TO AN ASSISTIVE ENERGY EMITTER IN ASSOCIATION WITH WRITING A FIRST SPIRAL TO A DISK SURFACE

82

APPLY A SECOND SET OF SETTINGS TO THE ASSISTIVE ENERGY EMITTER IN ASSOCIATION WITH WRITING A SECOND SPIRAL TO THE DISK SURFACE, WHEREIN THE SECOND SET OF SETTINGS IS DIFFERENT THAN THE FIRST SET OF SETTINGS.

84

DATA STORAGE DEVICE WITH SPIRAL WRITE MODE HOP MITIGATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices, such as hard disk drives with heat-assisted magnetic recording (HAMR) or other energy-assisted magnetic recording, with control circuitry that includes novel and inventive configurations to optimize assistive energy current applied to the assistive energy emitter, such as laser pre-bias current applied to a laser diode, while writing the spiral servo patterns to the disks in the manufacturing process, in accordance with aspects of the present disclosure. As part of the disk drive manufacturing process, new, blank disk drives perform a servo write process, such as a self-servo write process, before being usable for data storage. Control circuitry of the disk drive performs a sequence of spiral write operations in which it writes spiral servo patterns (also called spiral control patterns, spiral tracks, or, simply, spirals) that extend from an outside diameter location to an inside diameter location of a disk in the disk drive. The control circuitry then uses the spirals as navigational references when writing product servo sectors in concentric tracks on the disk. In one self-servo write technique, after the spirals have been written to the disk, a head internal to the disk drive reads a frequency signal in the spirals to generate a spiral position error signal (spiral PES) that is used to maintain the head along a substantially circular target path over the disk, and the head is then used to write the product servo sectors along the circular target path in a fill operation under the additional control of the down track phase of the product servo pattern using the spiral phase error signal (PhES). In this manner, the disk drive controls the cross-track and down-track positions of the selected head over the disk surface by maintaining the selected head along a circumferential track on the disk surface while writing product servo sectors at servo wedge locations in the circumferential track. The product servo sectors are written to the disk at locations corresponding to servo wedges $6_0$-$6_N$ as shown in FIG. 1, contain data such as preamble 8, sync mark 10, servo data 12, and servo bursts 14 as shown in FIG. 1, and are the final iteration of control patterns that will define the navigational reference control patterns for all subsequent nominal data write operations for the disk drive.

HAMR disk drives enable higher data densities than conventional perpendicular magnetic recording (PMR) heads. In HAMR disk drives, a laser diode comprised in each head heats the corresponding disk surface during write operations to decrease the magnetic coercivity of a high-coercivity magnetic medium of the disk surface, such as iron-platinum. The laser heats the high-coercivity medium thereby enabling a magnetic field generated by a write coil of the head to magnetize the temporarily heated area of disk surface. However, a challenge that has emerged with using HAMR disk drives is that the laser diode may exhibit non-ideal behavior by varying its intensity of emission non-linearly with respect to applied laser bias current, such as due to laser mode hop. Laser mode hop that occurs during the writing of spirals can distort the amplitude of the spirals at the mode hop locations, which can affect the spiral PES determined from the spirals in a manner that causes unintended concentric track pitch shift (e.g., unintended variations in the spacing between the concentric tracks on the disk) at the mode hop locations. Such concentric track pitch shift can negatively affect the accuracy of data reading and writing operations at these locations.

Implementations of the present disclosure address this problem by controlling settings applied to an assistive energy emitter, before and/or during writing the spirals to a disk in a HAMR disk drive, in a manner that controls radial locations of mode hop in respective ones of the spirals during the spiral write process. In various embodiments, control circuitry of the disk drive dithers one or more of the settings applied to a laser diode in a predefined manner that causes mode hop to occur at different locations in different ones of the spirals. By varying the mode hop locations in different ones of the spirals, rather than every spiral having the same mode hop locations, such implementations improve the resulting spiral PES in a manner that reduces or eliminates the unintended concentric track pitch shift described above.

Various illustrative aspects are directed to a data storage device comprising: one or more disks; an actuator mechanism configured to position one or more heads proximate to a corresponding disk surface of a corresponding disk of the one or more disks, the selected head comprising a write element and an assistive energy emitter; and one or more processing devices. The one or more processing devices, individually or in combination, are configured to: apply a first set of settings to the assistive energy emitter in association with writing a first spiral to the disk surface; and apply a second set of settings to the assistive energy emitter in association with writing a second spiral to the disk surface, wherein the second set of settings is different than the first set of settings.

Various illustrative aspects are directed to a method comprising applying different respective sets of settings to an assistive energy emitter in a head of a disk drive in association with writing respective spirals to a disk surface on a disk among one or more disks in the disk drive, wherein the applying is performed by one or more processing devices individually or in combination.

Various illustrative aspects are directed to one or more processing devices comprising means for: means for applying a first set of settings to an assistive energy emitter in a head of a disk drive in association with writing a first spiral to the disk surface; and means for applying a second set of settings to the assistive energy emitter in association with writing a second spiral to the disk surface, wherein the second set of settings is different than the first set of settings.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 1:
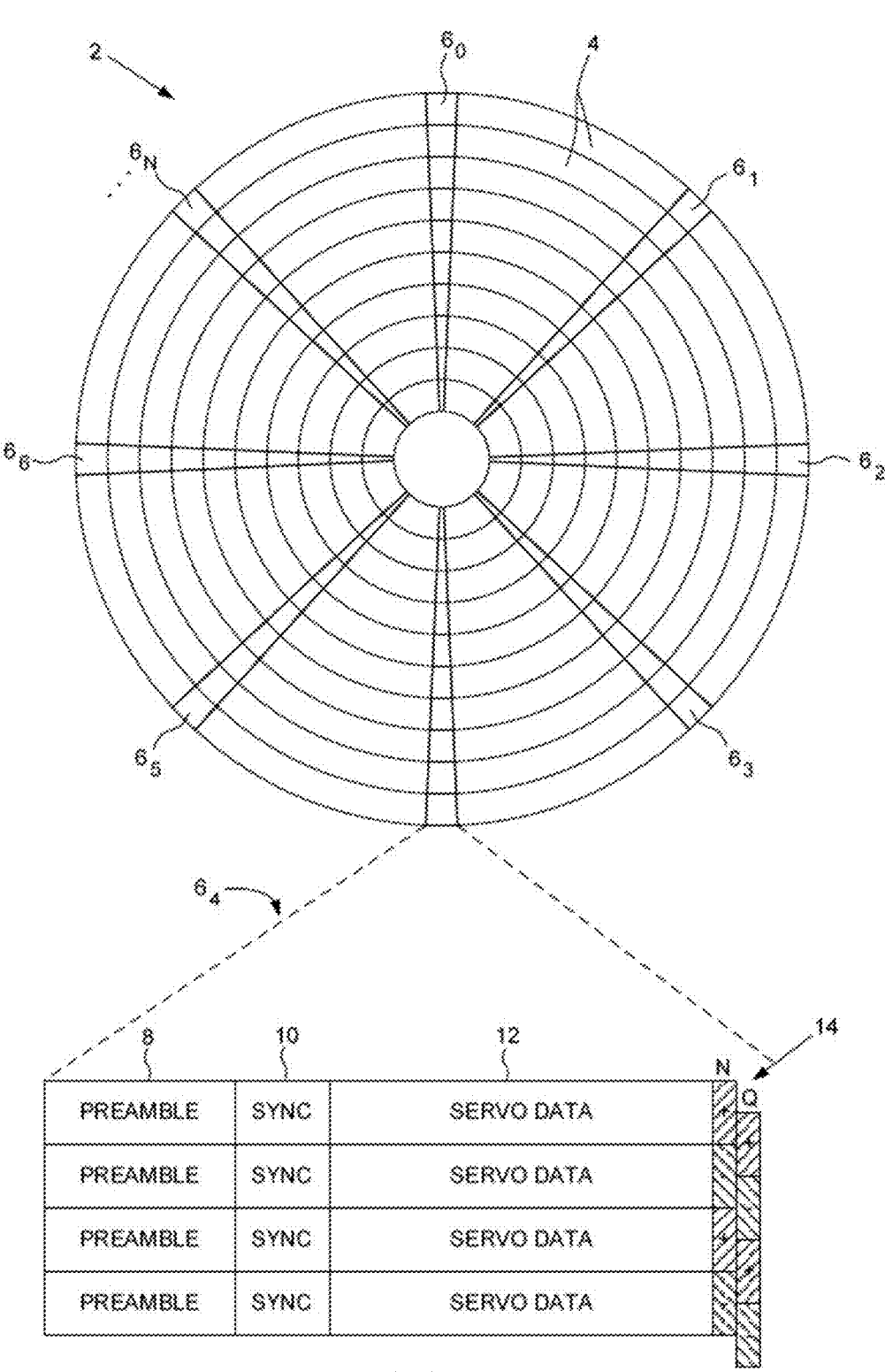
FIG. 1 shows a prior art disk format as comprising a number of radially-spaced, concentric servo tracks defined by servo wedges recorded around the circumference of each servo track.
Figures 2A, 2B, 2C:
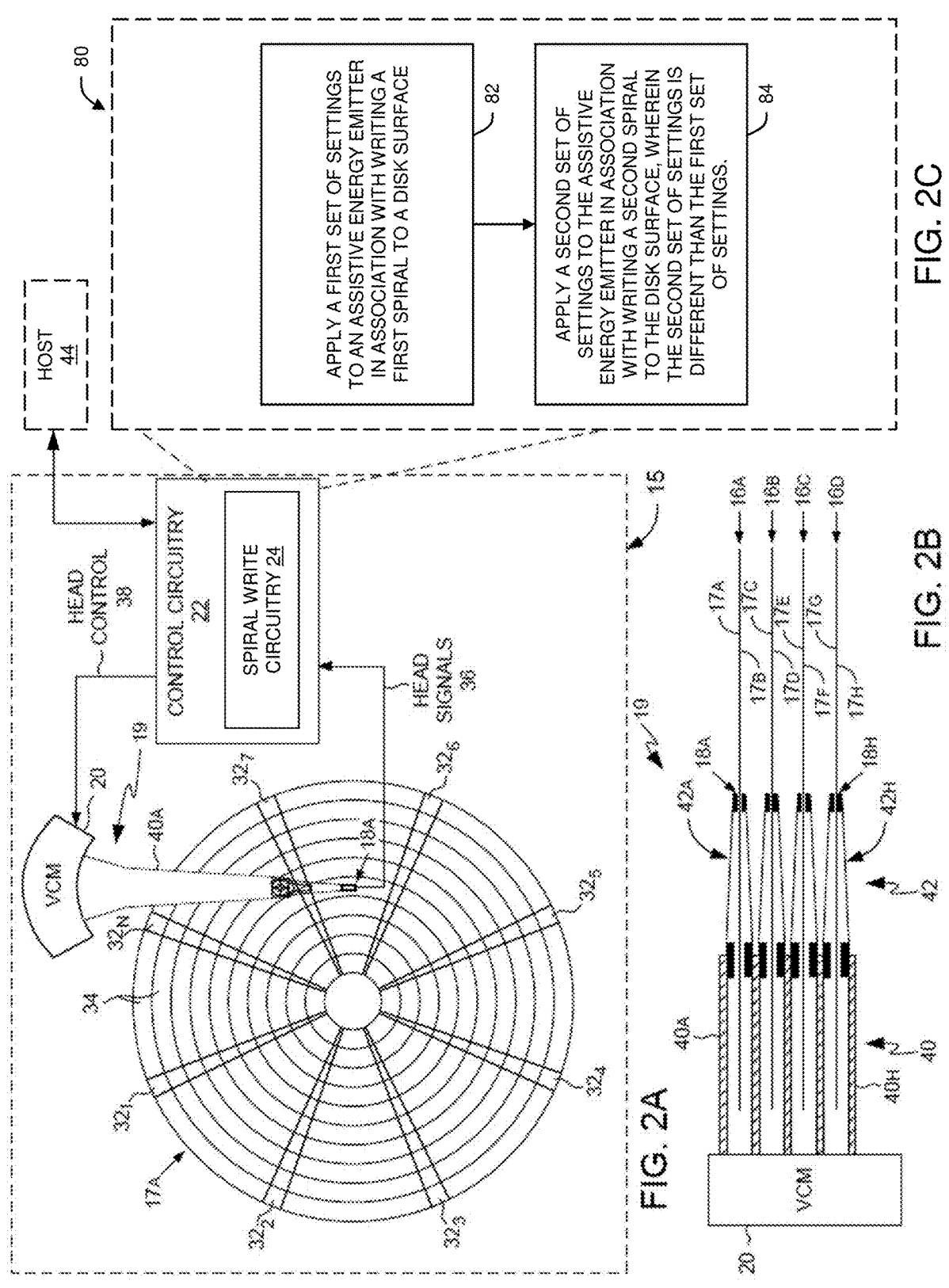
FIGS. 2A and 2B illustrate conceptual block diagrams of a top view and a side view of a data storage device in the form of a disk drive, in accordance with aspects of the present disclosure.
FIG. 2C depicts a flowchart for an example method that read/write channel circuitry of control circuitry of a disk drive may perform or execute in controlling the operations of the disk drive, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that spiral write circuitry 24 of control circuitry 22 may perform or execute in controlling the operations of disk drive 15, in accordance with aspects of the present disclosure, including writing different spirals using different respective sets of laser settings.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of primary actuator 20 in the example of FIGS. 2A and 2B, for example In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes head signals 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a head control signal 38 applied to actuator arm assembly 19, including to primary actuator 20, which functions as the primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, spiral write circuitry 24 of control circuitry 22 may apply a first set of settings to an assistive energy emitter in association with writing a first spiral to the disk surface (82). Spiral write circuitry 24 may further apply a second set of settings to the assistive energy emitter in association with writing a second spiral to the disk surface, wherein the second set of settings is different than the first set of settings (84). Control circuitry 22, including spiral write circuitry 24, may further perform additional actions, methods, and techniques, in accordance with various aspects including as further described herein.

The term "spiral write circuitry 24" as used herein may refer to any hardware, firmware, software, and/or combination thereof, comprised in control circuitry 22 of disk drive 15, which implements, embodies, or engages in any of the structures or functions ascribed herein to spiral write circuitry 24 or to any other of the novel and inventive aspects of the present disclosure. Spiral write circuitry 24 may constitute any hardware, firmware, software, and/or any other elements of control circuitry 22 for writing different spirals using different respective sets of laser settings, and performing other techniques and methods as described herein.

Figure 2D:
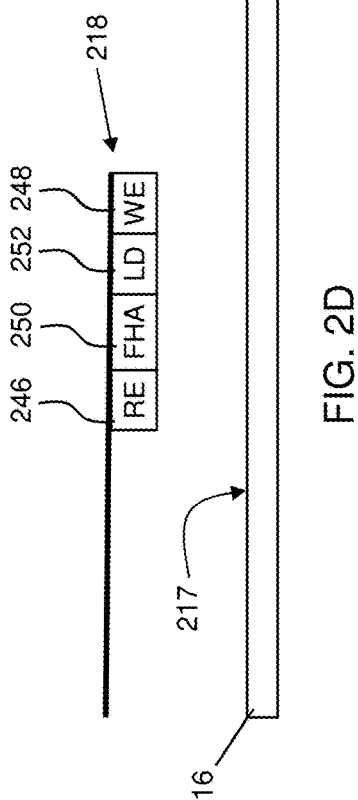
FIG. 2D depicts a conceptual side view diagram of a head of a disk drive, suspended above and operating proximate to a corresponding disk surface in accordance with various aspects of the present disclosure.

FIG. 2D depicts an example head 218 usable in a HAMR disk drive. In particular, FIG. 2D shows a disk 216 that corresponds to one of disks 16 of FIG. 2B and a head 218 that corresponds to one of heads 18 of FIG. 2B. The arrangement or disposition of elements of heads 18 of FIG. 2B described herein is not limited to any specific detail as shown in FIG. 2D, and the elements of heads 18 of FIG. 2B may be arranged in any of a variety of other configurations in other examples.

In embodiments, and with continued reference to FIG. 2D, head 218 includes a read element 246 (e.g., a magnetoresistive (MR) element), a write element 248 (e.g., an inductive write coil), a fly height actuator 250 (e.g., a thermal fly height control (TFC) element that actuates through thermal expansion or a piezoelectric actuator that actuates through mechanical deflection), and an assistive energy emitter comprising a laser diode 252. Energy-assisted magnetic recording heads in other examples of this disclosure may use any other applicable form of assistive energy emitter, such as a microwave emitter for microwave-assisted magnetic recording (MAMR), as another example. Control circuitry 22 (shown in FIG. 2A) writes data to disk surface 217 by modulating a write current in an inductive write coil in write element 248 to record magnetic transitions onto corresponding disk surface 217 in a process referred to as saturation recording. During readback, read element 246 senses the magnetic transitions, and a read channel demodulates the resulting read signal. Control circuitry may use fly height actuator 250 to induce changes in the fly height of head 218 above disk surface 217. Laser diode 252 may be used to generate a laser that is used to temporarily heat an area of disk surface 217 prior to passing under write element 248, as is understood in a HAMR disk drive. For example, laser diode 252 may be used with a waveguide and a near-field transducer (NFT) to project a plasmon onto disk surface 217 to heat an area of disk surface 217.

HAMR disk drives are susceptible to the phenomenon of mode hop (also called laser mode hop, mode hopping, and laser mode hopping) in which the output of the laser diode changes suddenly. In the example of FIG. 2D, when power (e.g., driving current) is applied to laser diode 252 during write operations, laser diode 252 may exhibit sudden changes between two or more available modes in which it emits a laser, due to the inherent physics of laser emission, which cause transients, or sudden shifts in magnitude, in output power of the laser being emitted by laser diode 252. Because such laser mode hopping can create sudden changes in the laser power, laser mode hopping may also cause sudden write width changes, even while the write current applied to write element 248 remains constant. That is, a greater or lesser width across the disk surface 217 may be susceptible to the constant write current in response to the laser suddenly becoming more or less powerful, respectively. When such changes in write width occur during the writing of a spiral to a disk surface, laser mode hopping may cause distortion of the spiral on the disk surface.

In embodiments, a pre-bias current is a current that is applied to laser diode 252, prior to the head writing to the disk surface 217, for the purpose of preparing the head for writing to the disk surface. Preparing the head for writing to the disk surface may include, for example and without limitation, one or more of: adjusting a fly height of the head through thermally induced protrusion of the write element and/or the NFT via heating that results from the pre-bias current being applied to the laser diode; and preparing laser diode 252 for subsequently emitting a write-assistance energy (e.g., emitting a laser via the NFT that induces a precision plasmon) for when the write element 248 is writing to the disk surface 217. In embodiments, a write current is a current that is applied to laser diode 252 that causes laser diode 252 to emit a write-assistance energy (e.g., emit a laser via the NFT that induces a precision plasmon) for when write element 248 is writing to the disk surface. Applying a pre-bias current or a write current to laser diode 252 causes self-heating of laser diode 252, which changes the internal temperature of laser diode 252.

Figure 3:
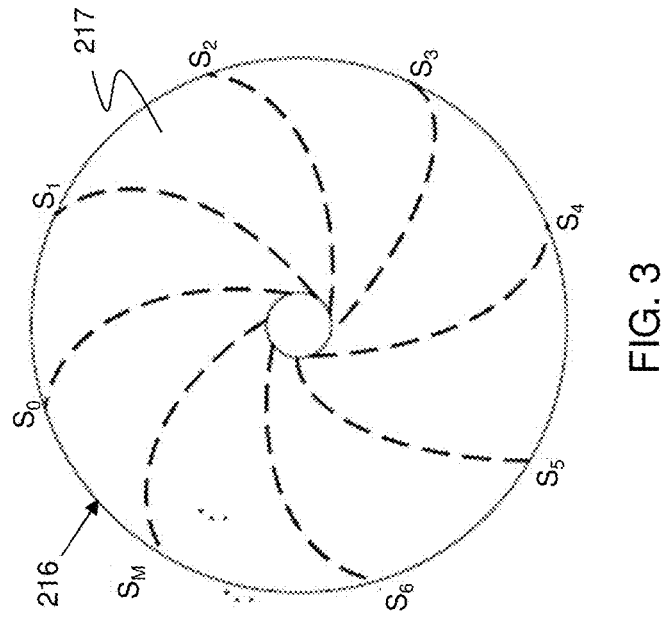
FIG. 3 shows an example of spirals written to the disk surface of a disk in accordance with various aspects of the present disclosure.

FIG. 3 shows an example of spirals $S_0$-$S_M$ written to disk surface 217 of disk 216. In various embodiments, the spirals $S_0$-$S_M$ are written by head 218, e.g., using laser diode 252 and write element 248, in a self-servo write process. The number of the spirals (e.g., M) may be in the hundreds for a single disk surface.

Some systems use the same laser settings with the laser diode for writing all the spirals to a disk surface. For example, some systems write each respective one of the spirals using the same process, which includes initially applying a pre-bias current having a nominal value of "X" to the laser diode for a pre-bias duration having a nominal value of "Y" and, immediately following the pre-bias, applying a write current having a nominal value of "Z" while writing the spiral to the disk surface using the write element. Using the same laser settings to write all the spirals in this manner results in each of the spirals having mode hop induced distortion at the same radial location(s) on the disk surface. This is because the occurrence of mode hop in a laser diode is dependent on the internal temperature of the laser diode, such that mode hop consistently and repeatedly occurs in a laser diode when the internal temperature of the laser diode passes through a mode hop threshold temperature. More specifically, the act of using the same laser diode settings for writing each spiral (e.g., applying the same pre-bias current for the same pre-bias time, and applying the same write current for the same write time, for each spiral) results in each spiral write process having the same relationship of internal temperature of the laser diode versus elapsed time of the spiral write process. Therefore, using the same laser diode settings for writing each spiral results in the internal temperature of the laser diode passing through a mode hope threshold temperature, and mode hop thus occurring, at the same time during the writing of each spiral. Moreover, because each spiral write process has the same relationship of radial position of the head over the disk surface versus the elapsed time of the spiral write process, mode hop occurs at the same radial location on the disk surface (e.g., the same circumferential track number) during the writing of each spiral.

Figure 4:
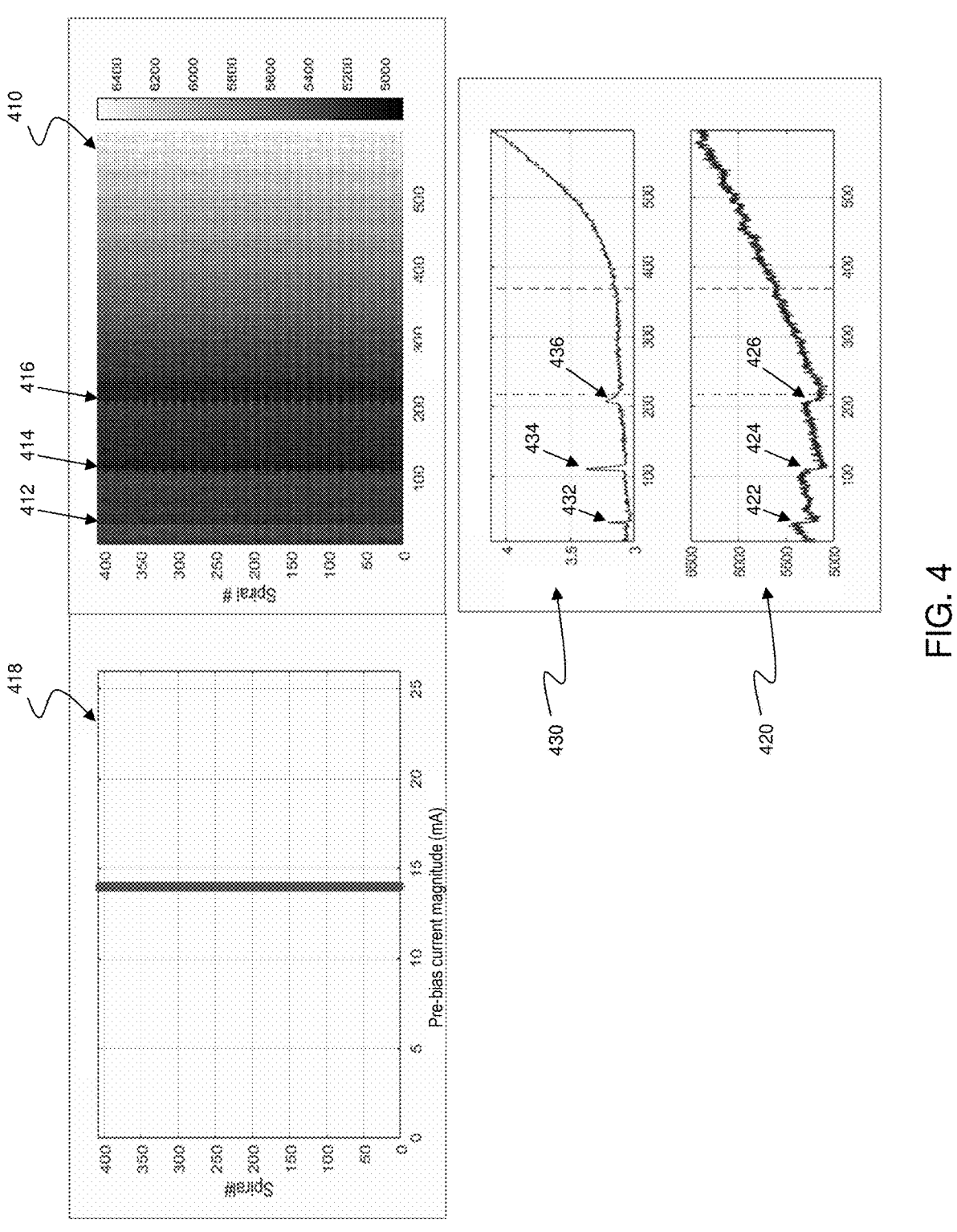
FIG. 4 depicts plots of empirical data that demonstrate the effect of mode hop when all spirals are written using the same set of laser settings.

FIG. 4 shows a surface plot 410 of amplitudes of spirals written to a disk surface using a technique in which all the spirals are written using the same set of laser settings. As used herein, the set of laser settings includes pre-bias current applied to the laser diode prior to writing a spiral, pre-bias duration for which the pre-bias current is applied, and write current applied to the laser diode immediately after the pre-bias current and while the write element writes the spiral to the disk surface. In plot 410, the vertical axis represents spiral number, the horizontal axis represents concentric track number in thousands along a radial direction of the disk surface, and the shaded scale represents amplitude of the spiral (e.g., the amplitude of the pattern of frequency data written as the spiral). In this example, it is seen from the vertical axis that there are slightly more than 400 spirals written on the disk surface, and it is seen from the horizontal axis that there are about 600,000 concentric tracks on the disk surface. In plot 410, abrupt changes in shading at locations 412, 414, and 416 indicate locations where mode hop occurred in the laser diode while writing the spirals.

FIG. 4 also shows a plot 418 of the pre-bias current applied to the laser diode prior to writing the spirals corresponding to plot 410. In plot 418, the vertical axis represents spiral number, and the horizontal axis represents a magnitude (in milliamps (mA)) of the pre-bias current applied to the laser diode for a pre-bias duration of time prior to applying a write current to the laser diode for writing the spirals. It is seen in plot 418 that the same pre-bias current is applied to the laser diode for each of the spirals. Although not shown, this same pre-bias current was applied for the same duration for each of the spirals, and the same write current was applied when writing each of the spirals. As such, all the spirals represented in plot 410 were written using the same set of laser settings, i.e., the same pre-bias current, the same pre-bias duration, and the same write current.

FIG. 4 also shows a plot 420 of the amplitude of a number of the spirals from the plot 410. In plot 420, the vertical axis represents amplitude of the spirals detected using the read element in the head, and the horizontal axis represents concentric track number in thousands along a radial direction of the disk surface. In plot 420, the amplitudes of the spirals have abrupt changes at locations 422, 424, and 426, which indicate locations where mode hop occurred in the laser diode while writing the spirals.

FIG. 4 also shows a plot 430 of spiral PES values that control circuitry of a disk drive generates based on reading the spirals corresponding to plot 410, e.g., slightly more than 400 spirals all written using the same set of laser settings and all having abrupt changes in their respective amplitudes at the same track locations due to mode hop occurring at these locations while writing the spirals. In plot 430, the vertical axis represents the spiral PES value, and the horizontal axis represents concentric track number in thousands along a radial direction of the disk surface. It is seen in plot 430 that the spiral PES values have spikes 432, 434, and 436 at the track locations that coincide with the mode hope locations shown in plots 410 and 420. These spikes in the spiral PES values can negatively affect the positioning of the head over the centerline of a track when writing the product servo sectors. For example, these spikes in the spiral PES values can cause concentric track pitch shift (e.g., variations in the spacing between the concentric tracks on the disk), which can negatively affect the accuracy of subsequent data operations (e.g., reading and writing) at these locations.

Figure 5:
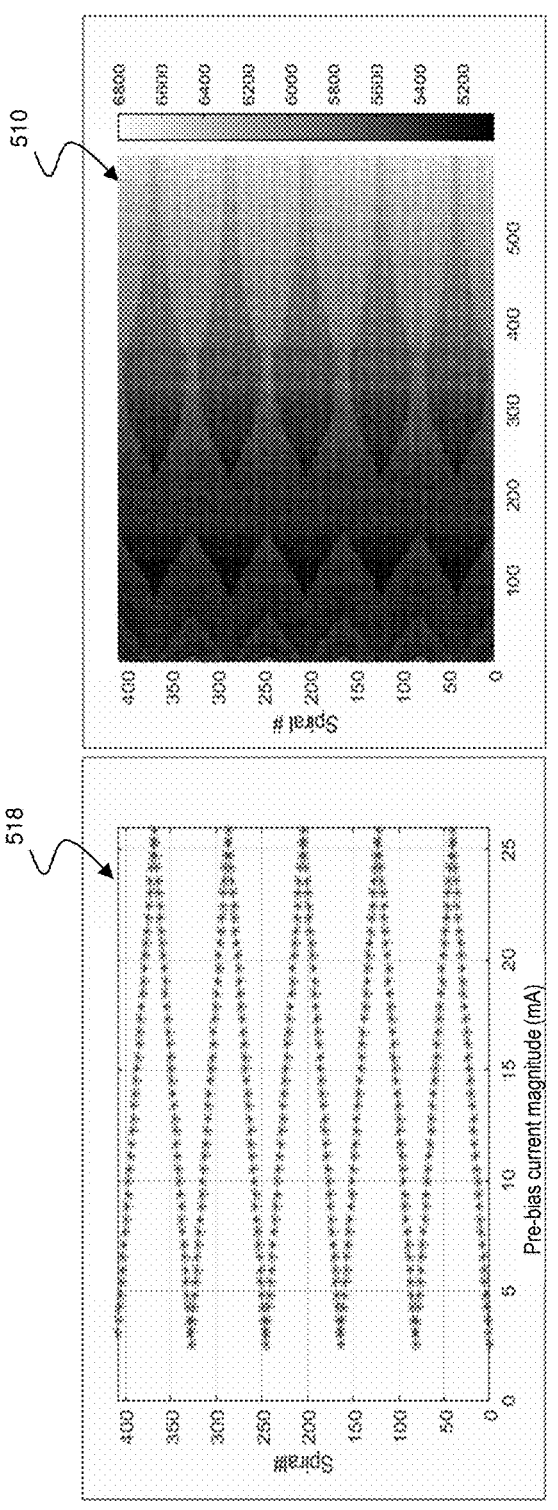
FIG. 5 depicts plots of empirical data that demonstrate mitigating the effect of mode hop by using different sets of laser settings when writing spirals in accordance with various aspects of the present disclosure.
Figure 5:
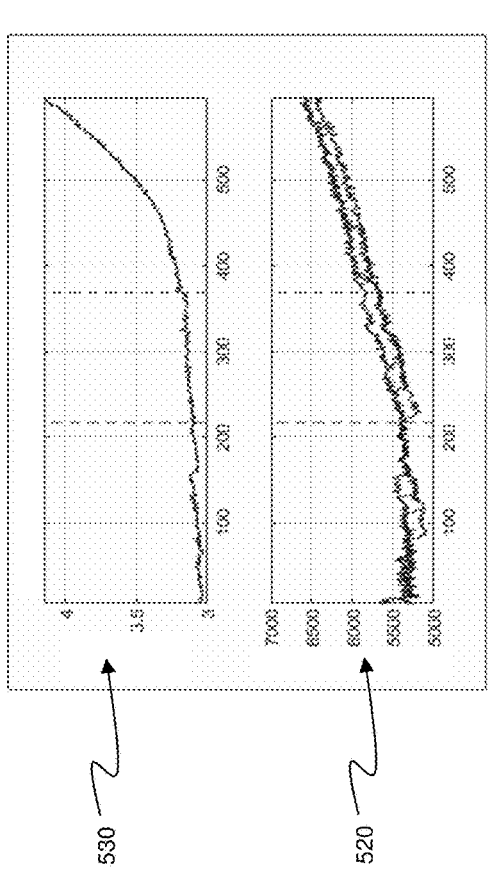

FIG. 5 shows a surface plot 510 of amplitudes of spirals written to a disk surface (e.g., such as disk surface 217 of FIG. 2D) using a novel technique in accordance with aspects of the present disclosure in which different respective ones of the spirals are written using different respective sets of laser settings. In plot 510, the vertical axis represents spiral number, the horizontal axis represents concentric track number in thousands along a radial direction of the disk surface, and the shaded scale represents amplitude of the spiral (e.g., the amplitude of the pattern of frequency data written as the spiral). In this example, it is seen from the vertical axis that there are slightly more than 400 spirals written on the disk surface, and it is seen from the horizontal axis that there are about 600,000 concentric tracks on the disk surface. In plot 510, abrupt changes in shading indicate locations where mode hop occurred in the laser diode while writing the spirals.

FIG. 5 also shows a plot 518 of the pre-bias current applied to the laser diode (e.g., laser diode 252 of FIG. 2D)

prior to writing the spirals corresponding to plot 510. In plot 518, the vertical axis represents spiral number, and the horizontal axis represents a magnitude (in mA) of the pre-bias current applied to laser diode 252 for a pre-bias duration of time prior to applying a write current to laser diode 252 while writing the spirals. In various embodiments, and as shown in plot 518, the spiral write circuitry 24 changes (e.g., dithers) the pre-bias current applied to laser diode 252 with each adjacent spiral. As such, spiral number n is written following applying a first pre-bias current having a first magnitude, spiral number n+1 is written following applying a second pre-bias current having a second magnitude that is different than that of the first pre-bias current, spiral number n+2 is written following applying a third pre-bias current having a third magnitude that is different than that of the first and second pre-bias current, and so on for all the spirals written to the disk surface. In various embodiments, after reaching a maximum magnitude, the changes reverse direction until reaching a minimum magnitude. In one example, this pattern of increasing and decreasing between a minimum magnitude and a maximum magnitude is repeated five times when writing all the spirals to the disk surface. In the example shown in FIG. 5, the respective pre-bias current for a respective spiral is applied for the same duration for each of the spirals, and the same write current is applied when writing each of the spirals. As such, spiral number n is written with a first set of laser settings, spiral number n+1 is written with a second set of laser settings that is different than the first set of laser settings, spiral number n+2 is written with a third set or laser settings that is different than the first and second set of laser settings, and so on for all the spirals written to the disk surface.

FIG. 5 also shows a plot 520 of the amplitude of a number of the spirals from plot 510. In plot 520, the vertical axis represents amplitude of the spirals detected using the read element in the head, and the horizontal axis represents concentric track number in thousands along a radial direction of the disk surface. In plot 520, amplitudes of different ones of the spirals have abrupt changes at different track numbers, which indicates that mode hop occurred at different radial locations over the disk surface while writing the different ones of the spirals. In accordance with aspects of the present disclosure, this spreading out of the mode hop locations at different radial locations for different ones of the spirals results in a smoothing of the spiral PES values that are generated using the spirals, as shown in plot 530, which shows spiral PES values that control circuitry 22 of the disk drive 15 generated based on reading the spirals corresponding to plot 510. In plot 530, the vertical axis represents the spiral PES value, and the horizontal axis represents concentric track number in thousands along a radial direction of the disk surface. Comparing plot 530 of FIG. 5 to plot 430 of FIG. 4, it is seen that the spiral PES values in plot 530 do not have spikes similar to the spikes 432, 434, and 436 in plot 430. This elimination of the spikes from the spiral PES values provides improved positioning of the head over the centerline of a track when writing the product servo sectors, since the relatively smaller variations in spiral PES values can be accommodated using wedge repeatable runout (WRRO) compensation values when writing the product servo sectors. It is therefore seen that using different sets of laser settings to write different ones of the spirals, thereby causing mode hop to occur at different radial locations over the disk surface while writing the different ones of the spirals, improves the spiral PES values that are generated from the spirals, which, in turn, reduces unwanted concentric track pitch shift.

FIG. 5 shows one example of using different sets of laser settings in association with writing different ones of the spirals in accordance with aspects of the present disclosure, e.g., using different magnitudes of pre-bias current for different ones of the spirals. In a specific example, the magnitude of the pre-bias current is increased by a predefined amount from one spiral to the next up to a maximum magnitude, and then decreased by the predefined amount from one spiral to the next down to a minimum magnitude, and so on as illustrated in plot 518. A nominal magnitude of the pre-bias current may be between the minimum magnitude and the maximum magnitude. Implementations are not limited to this example, and other dithering schemes may be used to change the magnitude of the pre-bias current from one spiral to the next when writing the spirals to the disk surface.

Figure 6:
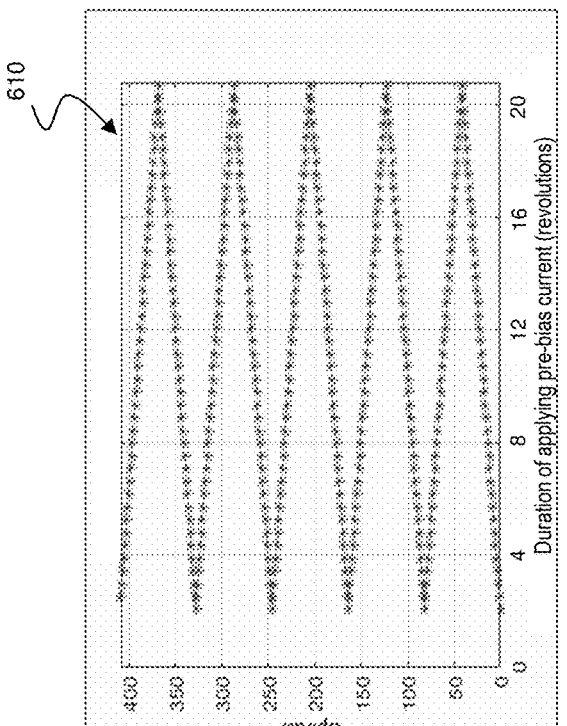
FIG. 6 depicts an example of varying laser settings in accordance with various aspects of the present disclosure.

FIG. 6 shows another example of using different sets of laser settings in association with writing different ones of the spirals in accordance with aspects of the present disclosure. In the example shown in FIG. 6, spiral write circuitry 24 controls the duration of the pre-bias current applied to laser diode 252 to be different for different ones of the spirals. In particular, plot 610 shows the pre-bias duration for different spirals written to the disk surface. In plot 610, the vertical axis represents spiral number, and the horizontal axis represents a duration (in disk revolutions) of applying the pre-bias current to laser diode 252 prior to applying a write current to laser diode 252 while writing the spirals. In various embodiments, and as shown in plot 610, the spiral write circuitry 24 of the disk drive changes (e.g., dithers) the pre-bias duration used with each adjacent spiral. As such, spiral number m is written following applying a first pre-bias current for a first duration, spiral number m+1 is written following applying a second pre-bias current for a second duration that is different than the first duration, spiral number m+2 is written following applying a third pre-bias current for a third duration that is different than the first and second duration, and so on for all the spirals written to the disk surface. In a specific example, the duration of the pre-bias current is increased by a predefined amount from one spiral to the next up to a maximum duration, and then decreased by the predefined amount from one spiral to the next down to a minimum duration, and so on as illustrated in plot 610. In one example, this pattern of increasing and decreasing between the minimum duration and the maximum duration is repeated five times when writing all the spirals to the disk surface. A nominal magnitude of the duration may be between the minimum duration and the maximum duration. Implementations are not limited to this example, and other dithering schemes may be used to change the duration of the pre-bias current from one spiral to the next when writing the spirals to the disk surface.

Figure 7:
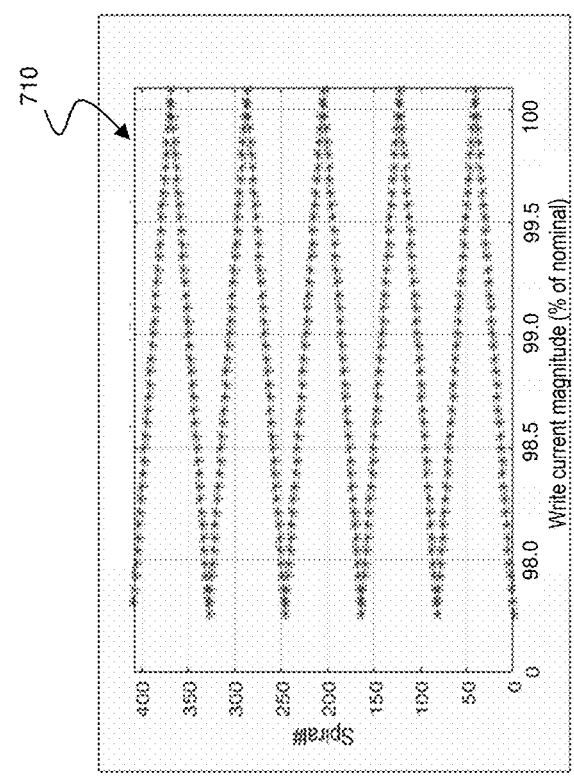
FIG. 7 depicts an example of varying laser settings in accordance with various aspects of the present disclosure.

FIG. 7 shows another example of using different sets of laser settings in association with writing different ones of the spirals in accordance with aspects of the present disclosure. In the example shown in FIG. 7, spiral write circuitry 24 controls the magnitude of the write current applied to laser diode 252 when writing the spirals such that the magnitude of the write current is changed from one spiral to the next. In particular, plot 710 shows the magnitude of the write current for different spirals written to a disk surface. In plot 710, the vertical axis represents spiral number, and the horizontal axis represents magnitude of the write current (expressed as a percentage of a predefined nominal magnitude of write current) applied to laser diode 252 prior while writing the spirals. In various embodiments, and as shown in plot 710, spiral write circuitry 24 changes (e.g., dithers) the write current magnitude used with each adjacent spiral. As such, spiral number k is written by applying a first write current to the laser diode while the write element writes the spiral to the disk surface, spiral number k+1 is written by applying a second, different write current to the laser diode while the write element writes the spiral to the disk surface, spiral number k+2 is written by applying a third, different write current to the laser diode while the write element writes the spiral to the disk surface, and so on for all the spirals written to the disk surface. In a specific example, the magnitude of the write current is increased by a predefined amount from one spiral to the next up to a maximum magnitude, and then decreased by the predefined amount from one spiral to the next down to a minimum magnitude, and so on as illustrated in plot 710. In one example, this pattern of increasing and decreasing between the minimum magnitude and the maximum magnitude is repeated five times when writing all the spirals to the disk surface. A nominal magnitude of the write current may be predefined for the disk drive. Implementations are not limited to this example, and other dithering schemes may be used to change the magnitude of the write current from one spiral to the next when writing the spirals to the disk surface.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, an SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:

one or more disks;

an actuator mechanism configured to position a selected head among one or more heads proximate to a disk surface of a corresponding disk among the one or more disks, the selected head comprising a write element and an assistive energy emitter; and one or more processing devices, individually or in combination, configured to:

apply a first set of settings to the assistive energy emitter in association with writing a first spiral servo pattern to the disk surface; and apply a second set of settings to the assistive energy emitter in association with writing a second spiral servo pattern to the disk surface, wherein the second set of settings is different than the first set of settings.

2. The data storage device of claim 1, wherein:

the first set of settings comprises a first pre-bias current, a first pre-bias duration, and a first write current; and the second set of settings comprises a second pre-bias current, a second pre-bias duration, and a second write current.

3. The data storage device of claim 2, wherein the first pre-bias current has a different magnitude than the second pre-bias current.

4. The data storage device of claim 2, wherein the first pre-bias duration has a different magnitude than the second pre-bias duration.

5. The data storage device of claim 2, wherein the first write current has a different magnitude than the second write current.

6. The data storage device of claim 2, wherein the one or more processing devices, individually or in combination, are further configured to:

apply the first pre-bias current to the assistive energy emitter for the first pre-bias duration prior to writing the first spiral servo pattern to the disk surface;

apply the first write current to the assistive energy emitter while writing the first spiral servo pattern to the disk surface;

apply the second pre-bias current to the assistive energy emitter for the second pre-bias duration prior to writing the second spiral servo pattern to the disk surface; and apply the second write current to the assistive energy emitter while writing the second spiral servo pattern to the disk surface.

7. The data storage device of claim 1, wherein the one or more processing devices, individually or in combination, are further configured to:

generate a spiral position error signal based on reading the first spiral servo pattern and the second spiral servo pattern; and control a position of the selected head over the disk surface using the spiral position error signal.

8. The data storage device of claim 7, wherein the controlling the position of the selected head over the disk surface using the spiral position error signal comprises controlling cross-track and down-track positions of the selected head over the disk surface by maintaining the selected head along a circumferential track on the disk surface while writing product servo sectors at servo wedge locations in the circumferential track.

9. The data storage device of claim 1, wherein the assistive energy emitter comprises a laser diode.

10. The data storage device of claim 1, wherein the data storage device comprises a heat-assisted magnetic recording disk drive.

11. A method comprising:

applying different respective sets of settings to an assistive energy emitter in a head of a disk drive in association with writing respective spiral servo patterns to a disk surface on a disk among one or more disks in the disk drive, wherein the respective spiral servo patterns are written to the disk surface using an inductive write coil in the head, and wherein the applying is performed by one or more processing devices individually or in combination.

12. The method of claim 11, wherein each of the respective sets of settings comprises a respective pre-bias current, a respective pre-bias duration, and a respective write current.

13. The method of claim 11, wherein:

a first one of the respective sets of settings applied in association with writing a first one of the respective spiral servo patterns comprises a first respective pre-bias current; and a second one of the respective sets of settings applied in association with writing a second one of the respective spiral servo patterns comprises a second respective pre-bias current that differs in magnitude from the first respective pre-bias current.

14. The method of claim 11, wherein:

a first one of the respective sets of settings applied in association with writing a first one of the respective spiral servo patterns comprises a first respective pre-bias duration; and a second one of the respective sets of settings applied in association with writing a second one of the respective spiral servo patterns comprises a second respective pre-bias duration that differs in magnitude from the first respective pre-bias duration.

15. The method of claim 11, wherein:

a first one of the respective sets of settings applied in association with writing a first one of the respective spiral servo patterns comprises a first respective write current; and a second one of the respective sets of settings applied in association with writing a second one of the respective spiral servo patterns comprises a second respective write current that differs in magnitude from the first respective write current.

16. One or more processing devices, individually or in combination, comprising:

means for applying a first set of settings to an assistive energy emitter in a head of a disk drive in association with writing a first spiral servo pattern to a disk surface; and means for applying a second set of settings to the assistive energy emitter in association with writing a second spiral servo pattern to the disk surface, wherein the second set of settings is different than the first set of settings.

17. The one or more processing devices of claim 16, wherein:

the first set of settings comprises a first pre-bias current, a first pre-bias duration, and a first write current; and the second set of settings comprises a second pre-bias current, a second pre-bias duration, and a second write current.

18. The one or more processing devices of claim 17, wherein the first pre-bias current has a different magnitude than the second pre-bias current.

19. The one or more processing devices of claim 17, wherein the first pre-bias duration has a different magnitude than the second pre-bias duration.

20. The one or more processing devices of claim 17, wherein the first write current has a different magnitude than the second write current.

\* \* \* \* \*